US010108398B2

(12) United States Patent
Quinnell

(10) Patent No.: US 10,108,398 B2
(45) Date of Patent: *Oct. 23, 2018

(54) HIGH PERFORMANCE FLOATING-POINT ADDER WITH FULL IN-LINE DENORMAL/SUBNORMAL SUPPORT

(71) Applicant: Samsung Electronics Co., Ltd., Suwon-si, Gyeonggi-do (KR)

(72) Inventor: Eric C. Quinnell, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,971

(22) Filed: Nov. 10, 2017

(65) Prior Publication Data

US 2018/0081630 A1    Mar. 22, 2018

Related U.S. Application Data

(63) Continuation of application No. 14/161,671, filed on Jan. 22, 2014, now Pat. No. 9,830,129.

(Continued)

(51) Int. Cl.
G06F 7/485 (2006.01)
G06F 7/499 (2006.01)
G06F 7/50 (2006.01)

(52) U.S. Cl.
CPC .......... *G06F 7/485* (2013.01); *G06F 7/49915* (2013.01); *G06F 7/49936* (2013.01); *G06F 7/50* (2013.01)

(58) Field of Classification Search
CPC ........ G06F 7/485; G06F 7/50; G06F 7/49915; G06F 7/49936

(Continued)

(56) References Cited

U.S. PATENT DOCUMENTS 4,926,369 A    5/1990   Hokenek et al.
5,146,419 A    9/1992   Miyoshi et al.
(Continued)

FOREIGN PATENT DOCUMENTS

CN    101042583 A    9/2007
CN    101133389 A    2/2008
(Continued)

OTHER PUBLICATIONS

Beaumont-Smith et al,. "Reduced Latency IEEE Floating-Point Standard Adder Architectures," IEEE ARITH 1999.

(Continued)

*Primary Examiner* — Matthew Sandifer
(74) *Attorney, Agent, or Firm* — Renaissance IP Law Group LLP

(57) ABSTRACT

According to one general aspect, an apparatus may include a floating-point addition unit that includes a far path circuit, a close path circuit, and a final result selector circuit. The far path circuit may be configured to compute a far path result based upon either the addition or the subtraction of the two floating-point numbers regardless of whether the operands or the result include normal or denormal numbers. The close path circuit may be configured to compute a close path result based upon the subtraction of the two floating-point operands regardless of whether the operands or the result include normal or denormal numbers. The final result selector circuit may be configured to select between the far path result and the close path result based, at least in part, upon an amount of difference in the exponent portions of the two floating-point operands.

20 Claims, 6 Drawing Sheets

Related U.S. Application Data

(60) Provisional application No. 61/907,374, filed on Nov. 21, 2013.

(58) Field of Classification Search
USPC .............................. 708/495, 505, 205, 498
See application file for complete search history.

(56) References Cited

U.S. PATENT DOCUMENTS

| | | | |
|---|---|---|---|
| 5,267,186 A * | 11/1993 | Gupta ..................... | G06F 7/483 708/205 |
| 5,372,007 A | 12/1994 | Garbo | |
| 5,493,520 A | 2/1996 | Schmookler et al. | |
| 5,732,007 A | 3/1998 | Grushin et al. | |
| 5,808,926 A | 9/1998 | Gorshtein et al. | |
| 5,931,895 A * | 8/1999 | Yamada ................... | G06F 7/483 708/205 |
| 6,085,211 A * | 7/2000 | Yoshioka ................ | G06F 7/485 708/205 |
| 6,405,232 B1 * | 6/2002 | Green ..................... | G06F 5/012 708/505 |
| 7,698,353 B2 | 4/2010 | Tan et al. | |
| 8,214,416 B2 | 7/2012 | Rigge | |
| 8,214,417 B2 | 7/2012 | Ahmed | |
| 8,260,837 B2 | 9/2012 | Powell, Jr. et al. | |
| 8,266,198 B2 | 9/2012 | Lee et al. | |
| 8,463,835 B1 | 6/2013 | Walke | |
| 2002/0165887 A1 * | 11/2002 | Rogenmoser ........... | G06F 7/485 708/211 |
| 2003/0055859 A1 | 3/2003 | Seidel et al. | |
| 2003/0115236 A1 | 6/2003 | Naini et al. | |
| 2006/0036667 A1 | 2/2006 | Srivastava | |
| 2006/0101244 A1 | 5/2006 | Siu et al. | |
| 2010/0042665 A1 * | 2/2010 | Ahmed .................... | G06F 7/485 708/209 |
| 2012/0215823 A1 | 8/2012 | Lutz | |
| 2013/0007084 A1 | 1/2013 | Nystad | |
| 2013/0218938 A1 | 8/2013 | Dockser et al. | |
| 2014/0188966 A1 | 7/2014 | Galal et al. | |

FOREIGN PATENT DOCUMENTS

| | | |
|---|---|---|
| CN | 102855117 A | 1/2013 |
| JP | H03218518 A | 9/1991 |
| JP | 2003029960 A | 1/2003 |
| JP | 2008510229 A | 4/2008 |
| JP | 2013012203 A | 1/2013 |

OTHER PUBLICATIONS

Y. Levin, "Supporting Denormalized Numbers in an IEEE Compliant Floating-Point Adder Optimized for Speed," http://hyde.eng.tau.ac.ii/Projects/FPADD/index.html, 2001.

* cited by examiner

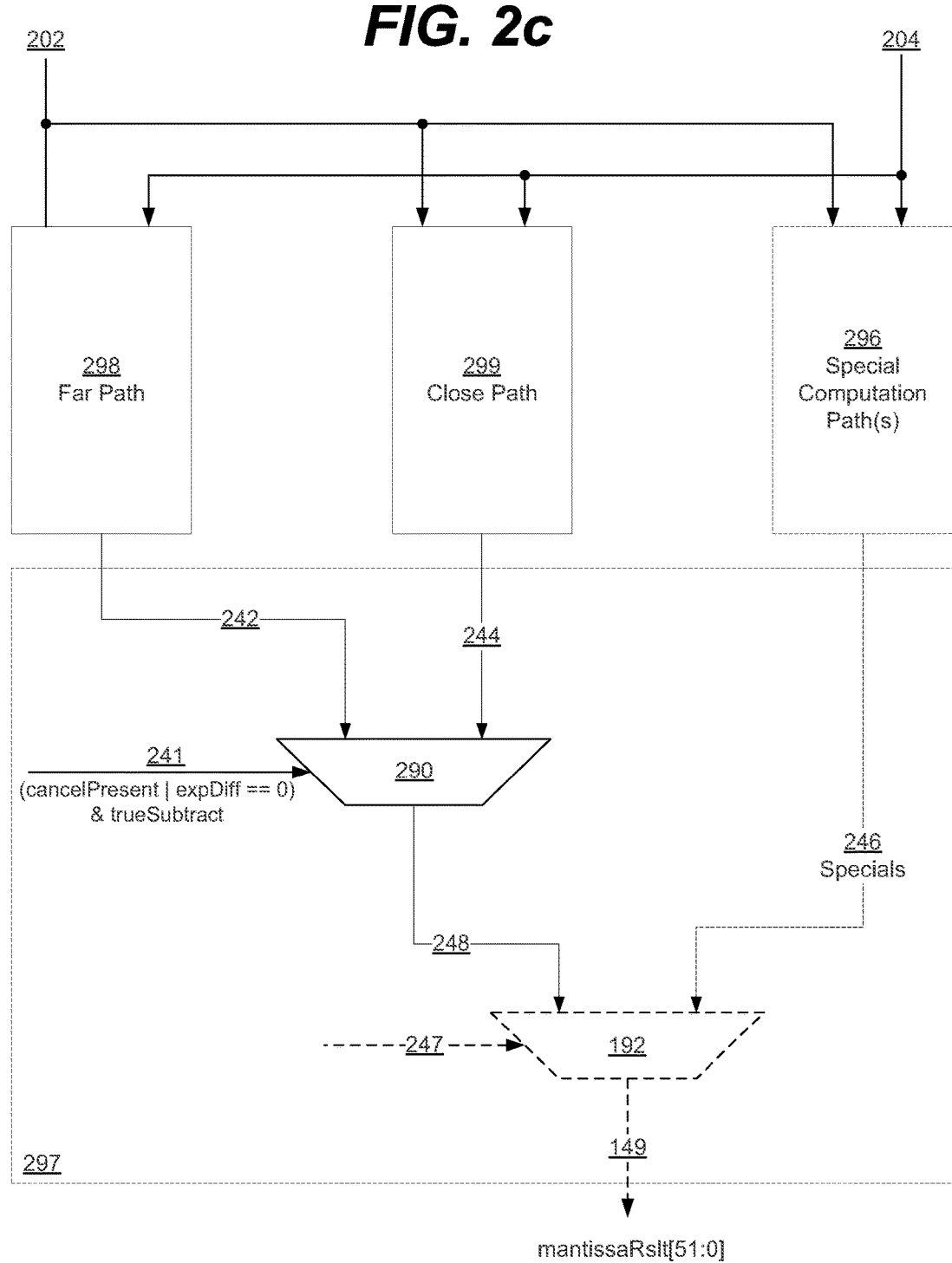

HIGH PERFORMANCE FLOATING-POINT ADDER WITH FULL IN-LINE DENORMAL/SUBNORMAL SUPPORT

CROSS-REFERENCE TO RELATED APPLICATION

This application is a continuation of, and claims priority under 35 U.S.C. § 120 to, application Ser. No. 14/161,671, filed on Jan. 22, 2014, which claims the priority benefit, under 35 U.S.C. § 119, of U.S. Provisional Application Ser. No. 61/907,374, entitled "High Performance Floating-Point Adder With Full In-Line Denormal/Subnormal Support" filed on Nov. 21, 2013. The subject matter of these earlier filed applications are hereby incorporated by reference.

TECHNICAL FIELD

This description relates to the electrical computation of mathematical operations, and more specifically to the computation of floating-point addition of both normal and denormal numbers.

BACKGROUND

In computing, a floating-point number generally includes a technique for representing an approximation of a real number in a way that can support a wide range of values. These numbers are, in general, represented approximately to a fixed number of significant digits and scaled using an exponent. The term "floating-point" refers to the fact that a number's radix point (e.g., decimal point, or, more commonly in computers, binary point) can "float"; that is, it can be placed anywhere relative to the significant digits of the number. This position is indicated as the exponent component in the internal representation, and floating-point can thus be thought of as a computer realization of scientific notation (e.g., $1.234 \times 10^4$ versus 1,234, etc.).

The Institute of Electrical and Electronics Engineers (IEEE) Standard for Floating-Point Arithmetic (IEEE 754) is a technical standard for floating-point computation established in 1985 by the IEEE. Many hardware floating-point units or circuits are substantially compliant with the IEEE 754 standard. Herein, the term "IEEE 754" refers to standards substantially complaint with the *IEEE Standard for Floating-Point Arithmetic*, IEEE Std. 754-2008 (29 Aug. 2008) or standards derived from or preceding that standard.

The IEEE 754 standard allows for various degrees of precision. The two more common levels of precision include a 32-bit (single) and 64-bit (double) precision. The 32-bit version of a floating-point number includes a 1-bit sign bit (that indicates whether the number is positive or negative), an 8-bit exponent portion (that indicates the power of 2 where the radix point is located) and a 23-bits fraction, significand, or mantissa portion (that indicates the real number that is to be multiplied by 2 raised to the power of the exponent portion). The 64-bit version includes a 1-bit sign indicator, 11-bit exponent portion, and a 52-bit fraction portion. It is understood that the above are merely a few illustrative examples to which the disclosed subject matter is not limited.

SUMMARY

According to one general aspect, an apparatus may include a floating-point addition unit configured to generate a floating-point result by either adding or subtracting two floating-point operands together, wherein each floating-point operand includes a fraction portion and an exponent portion. The floating-point addition unit may include a far path circuit, a close path circuit, and a final result selector circuit. The far path circuit may be configured to compute a far path result based upon either the addition or the subtraction of the two floating-point numbers regardless of whether each of the two floating-point operands or the floating-point result respectively include a normal number or a denormal number. The close path circuit may be configured to compute a close path result based upon the subtraction of the two floating-point operands regardless of whether either each of the two floating-point operands or the floating-point result respectively include a normal number or a denormal number. The close path circuit may include a clamp circuit configured to limit a radix shifting of the close path result when the close path result includes a denormal number. The final result selector circuit may be configured to select between the far path result and the close path result based, at least in part, upon an amount of difference in the exponent portions of the two floating-point operands.

According to another general aspect, a method may include receiving a first floating-point operand and a second floating-point operand. The method may include computing a far path result based upon either an addition or a subtraction of the first floating-point operand and the second floating-point operand, regardless of whether at least one of the first floating-point operand, the second floating-point operand, or the far path result includes a denormal number. The method may include computing a close path result based upon a subtraction of the first floating-point operand and the second floating-point operand regardless of whether at least one of the first floating-point operand, the second floating-point operand, or the close path result includes a denormal number, wherein computing the close path result includes limiting an amount of radix shifting of the close path result if the close path result includes a denormal number. The method may include selecting between the far path result and the close path result based, at least in part, upon a difference between an exponent portion of the first floating-point operand and an exponent portion of the second floating-point operand.

According to another general aspect, a system may include a memory and a processor. The memory may be configured to store two floating-point operands. The processor may include a floating-point addition unit configured to generate a floating-point result by either adding or subtracting two floating-point operands together, wherein each floating-point number includes a fraction portion and an exponent portion. The floating-point addition unit may include a far path circuit, a close path circuit, and a final result selector circuit. The far path circuit may be configured to compute a far path result based upon either the addition or the subtraction of the two floating-point numbers regardless of whether either of the two floating-point operands or the floating-point result includes a normal number or a denormal number. The close path circuit may be configured to compute a close path result based upon the subtraction of the two floating-point operands regardless of whether either of the two floating-point operands or result includes a normal number or a denormal number. The close path circuit may include a clamp circuit configured to limit a radix shifting of the close path result when the close path result includes a denormal number. The final result selector circuit may be configured to select between the far path result and the close path result based, at least in part, upon an amount of difference in the exponent portions of the two floating-point operands The details of one or more implementations are set forth in the accompanying drawings and the description below. Other features will be apparent from the description and drawings, and from the claims.

A system and/or method for the electrical computation of mathematical operations, substantially as shown in and/or described in connection with at least one of the figures, as set forth more completely in the claims.

BRIEF DESCRIPTION OF THE DRAWINGS

FIG. 2c is a block diagram of an example embodiment of a floating-point adder in accordance with the disclosed subject matter.

Like reference symbols in the various drawings indicate like elements.

DETAILED DESCRIPTION

Figure 1:
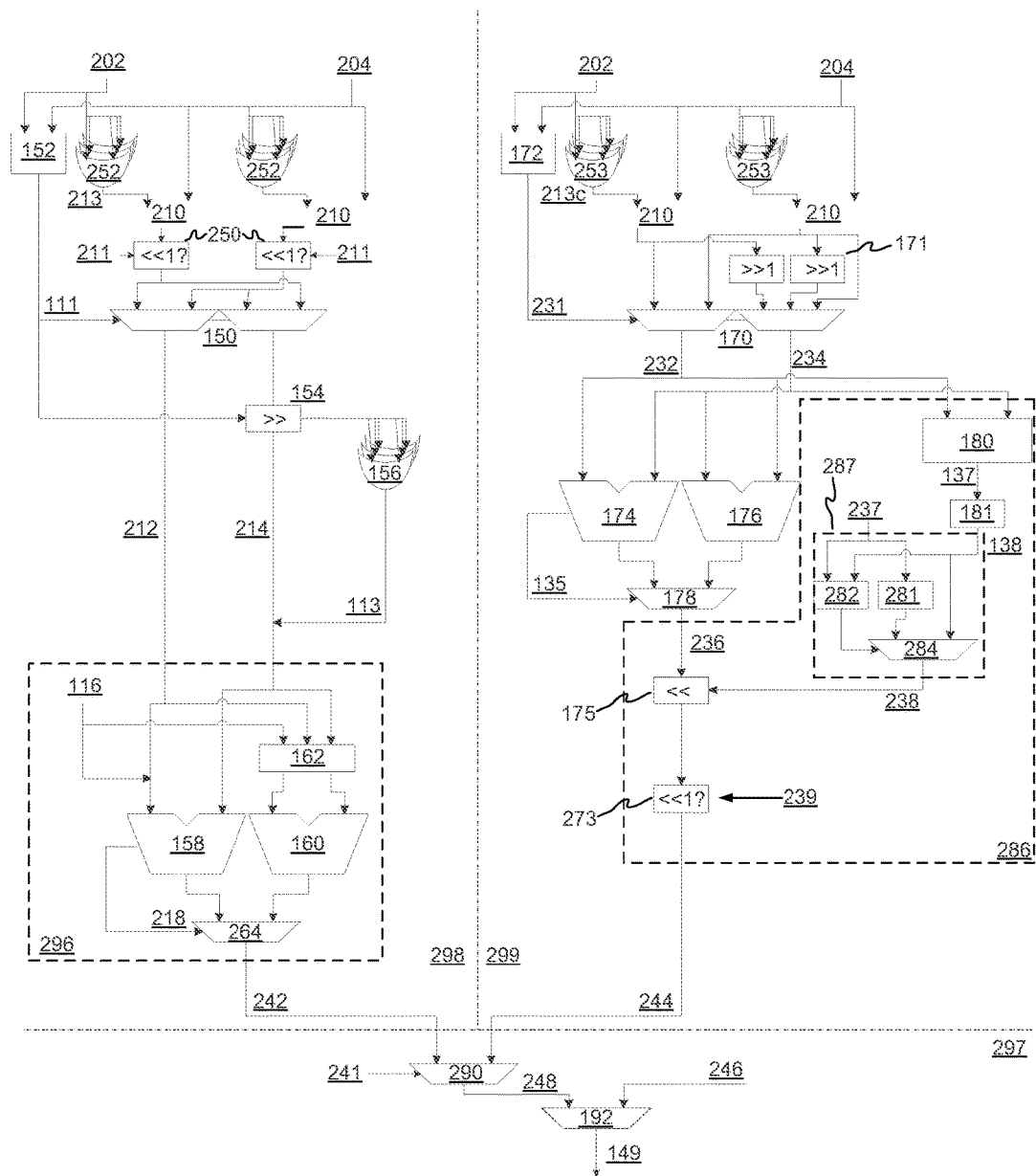
FIG. 1 is a block diagram of an example embodiment of a floating-point adder in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

As described above, in computing devices floating-point numbers are represented by a set number of bits. This means that floating-point numbers may only represent a discrete and constrained part of the infinite number space as bounded by their allocated number of bits. For a normal floating-point number, the number is represented similar to standard scientific notation format, with a whole number in the significand portion of the number and the exponent portion used to indicate where the radix point should be. For example, in a decimal system 23,467 is represented as $2.3467 \times 10^4$, where the single digit of whole number is 2 and the radix point is 4 places to the right. When a number is represented in binary, the most significant bit is always 1. It is understood that the use of scientific notation herein is used due to its relatability to the common reader, and are merely illustrative examples. It is further understood that a preferred disclosed subject matter is focused on binary numbers.

When a floating-point number is small, there are no leading zeros in the significand or fraction portion. Instead, leading zeros are removed by adjusting the exponent portion. So (in decimal) 0.0123 would be written as $1.23 \times 10^{-2}$ and the leading zeros would be removed.

However, according to the IEEE 754 standard, in some cases there are numbers where the floating-point notation would result in an exponent that is too small to be correctly represented. As the computing device is limited to the number of bits used to represent the exponent portion, it is possible for the value needed to indicate the proper amount of radix shift to be larger than the number of bits the computing device has available in the exponent portion of the floating-point number. For example, if a floating-point includes 8 bits for the exponent, the exponent may be within a range between 127 and −126. That means that if a number has an exponent smaller than −126 (e.g., $2^{-134}$, etc.), the normal floating-point number scheme would not be able to represent it without the possibility of significant mathematical error.

Numbers such as this are referred to as "denormal numbers", "denormalized numbers", or "subnormal numbers", and generally cause difficulties in computing circuits. Denormal numbers require a slightly different encoding scheme than normal numbers. First, as according to the IEEE 754 specification, the leading digit of the significand of denormal numbers is 0. Instead of changing the exponent, leading zeros remain within the significand. Secondly, the exponent portion of a denormal number is 0. That is, instead of representing 0.01234 as $1.234 \times 10^{-2}$ a denormal number is represented as $0.01234 \times 10^0$ (it is understood that a real denormal number would have an exponent value much smaller than $10^{-2}$, e.g., $10^{-38}$ or $2^{-127}$, but the writing out of the 38 leading zeros would be excessive for the example). In one embodiment, a 32-bit floating-point denormal number may include values roughly between $2^{-127}$ and $2^{-149}$ as the significand can accommodate 22 leading 0s. Generally, denormal numbers allow for smaller and smaller numbers to be represented but as the number of leading 0s increases, the amount of precision (i.e. significant digits) included in the number decreases. This is a phenomenon known as "gradual underflow" and is generally preferred to the alternative of just declaring a small number to be zero.

Some computing systems handle denormal values in hardware. Traditionally, such a computing system would use a first hardware unit to compute normal number addition and a second hardware unit to compute denormal number addition. Other computing systems leave the handling of denormal values to system software. Handling denormal values in software generally leads to a further significant decrease in performance. But even when denormal values are entirely computed in hardware, the speed of computation is significantly reduced on most modern processors; in extreme cases, instructions involving denormal operands may run as much as 30-100 times slower than those for normal operands.

FIG. 1 is a block diagram of an example embodiment of a system or FPA (floating-point adder) 100 in accordance with the disclosed subject matter. In the illustrated embodiment, system includes a floating-point addition (FPA or FADD) unit or circuit 100. In such an embodiment, the FPA 100 is configured to perform addition and/or subtraction on two floating-point operands or values 202 and 204, and generate the result 248.

The FPA 100 differs significantly from a traditional FPA, in that the FPA 100 is configured to process or compute floating-point addition operations even if one or more of the operands 202 and 204 or the result 248 is a denormal number. Whereas a traditional FPA may only correctly process normal numbers, the FPA 100 is configured to process normal numbers, denormal numbers, or a combination thereof.

The workings of a traditional floating-point adder are briefly described in order to contrast its functioning with the improved system of FIG. 1. Traditionally, an FPA is configured to only perform addition (or subtraction) on two normal floating-point numbers and generate the normal floating-point result. In such an embodiment, any non-normal operations are performed by separate hardware that generates the non-normal or special result (similar to special result 246). The system then selects between the normal result (similar to result 248) and the special result via the circuit or multiplexer (MUX) 192, producing the ultimate result 149.

In various embodiments, the special result may be generated by one or more of the following conditions: infinity is encountered, a Not-a-Number (NaN) value is encountered, a zero is encountered, or a denormal value is encountered (e.g., in the operands, the result, etc.). In such an embodiment, the normal result of the FPA is considered incorrect (i.e. having the wrong value, etc.) and is ignored. Instead, other hardware (shown in FIG. 2c) is used to accurately compute the correct result value. Generally, the computation of these non-normal values takes a significant amount of computational time compared to the computation of the normal result.

Occasionally, the addition of denormal numbers is performed by a floating-point multiply accumulate unit (FMAC or FMADD or FMA) (not explicitly shown). This is costly in terms of hardware space and components and in terms of computational power, and is an undesirable tradeoff. FPAs are generally more desirable for straight addition or subtraction (in terms of space, power, etc.). In the illustrated embodiment, the FPA 100 is incapable of performing floating-point multiplication operations.

As described above, in the traditional FPA case, the occurrence of a denormal number would result in the invocation of special hardware. The non-normal result would then be selected by the circuit or MUX 192 as the ultimate result 149. In such an embodiment, the output of the traditional FPA (similar to result 248) would be discarded. As described above, the invocation of the special hardware to process the denormal values would be expensive in terms of computation time and possibly involve the use of another circuit (e.g., a FMAC, etc.) that may be occupied or made unavailable to another operation (i.e. a reduction in parallel computing power, etc.).

In the illustrated embodiment, the FPA 100 is configured to perform floating-point addition on both normal and denormal numbers without incurring the performance hit experienced in the traditional case when denormal numbers are encountered. The operation of the FPA 100 is detailed below.

Like the traditional FPA, the FPA 100 includes three basic portions: the Far path 298, the Close path 299, and the selection circuit 297. In various embodiments, the Far path 298 may be configured to perform all ranges of the addition operation or the subtraction operation when the exponent portions of the two operands 202 and 204 differ by more than an order of magnitude (e.g., 1,234−34, etc.). Conversely, the Close path 299 may be configured to perform the subtraction operation when the exponent portion (or absolute value) of the two operands 202 and 204 differ by less than an order of magnitude (e.g., 1,234+−1,236, etc.). The selection circuit 297 may be configured to select between the far path result 242 and the close path result 244 to generate the final (non-special) result 248 or the ultimate result 149 (depending on the embodiment). These portions of the FPA 100 are discussed general detail in regards to FIG. 1, and then shown in greater detail in regards to FIGS. 2a, 2b, and 2c.

In the illustrated embodiment of FPA 100, the operands 202 and 204 are processed in parallel by the Far path 298 and the Close path 299 before the difference in the exponent portions of the two operands 202 and 204 is known. As a result, one of the two paths' results 242 or 244 will be inaccurate and will be discarded by the selection circuit 297 (as by that time the difference in exponent portions is known). This parallel computation has the desirable effect of increasing the speed of the computation but the less desirable effects of increasing the size of the FPA 100 and the power consumed by the FPA 100.

Each of these three portions 297, 298, and 299 of FIG. 1 perform operations roughly analogous to the similar portions of a traditional FPA. However, as described above, the Far path 298, the Close path 299, and the selection circuit 297 may be configured to process normal and/or denormal numbers, whereas the traditional FPA portions can only process normal numbers.

In the illustrated embodiment, the FPA 100 receives the two operands 202 and 204. In such an embodiment, the operands 202 and 204 may be floating-point numbers and may include normal and/or denormal numbers. For illustrative purposes, this text will treat the operands 202 and 204 as including 64-bit IEEE 754 compliant floating-point numbers. As such, the operands 202 and 204 each include a 1-bit sign indicator, an 11-bit exponent portion, and a 52-bit fraction portion. It is understood that the above is merely one illustrative example to which the disclosed subject matter is not limited.

The operation of the Far Path 298 is examined first. In the illustrated embodiment, the operands 202 and 204 are input into the far path 298. The operands 202 and 204 are each subjected to a denormal number detection circuit 252. In one embodiment, the denormal number detection circuit 252 may include a series of OR gates (e.g., an OR tree, etc.). In one embodiment, denormal number detection circuit 252 may be configured to detect if the fraction portion of the respective operand 202 or 204 includes a leading 0. In various embodiments, the denormal number detection circuit 252 may generate a denormal indicator signal 213.

Traditionally an FPA, assuming the operands are normal numbers, may concatenate a leading 1 to the fraction portion of the operands to generate the pre-swapped signals (similar to signals 210). In the illustrated embodiment, the FPA 100 may concatenate the inverse of the denormal indicator signal 213 to the fraction portion of the operands 202 and 204 to generate the pre-swapped signals 210. In such an embodiment, a pre-swapped signal 210 generated by a normal operand would include a leading 1, whereas one generated from a denormal operand would include a leading 0.

In the illustrated embodiment, the far path 298 of the FPA 100 includes a leading bit compensation circuit 250. Addition of numbers represented in floating-point format is problematic, as the fraction portions of the operands are often not initially aligned (i.e., have the same exponent values). Generally, such a problem is handled by the radix alignment circuit 154, described below.

The IEEE 754 standard includes an oddity in the way numbers are encoded between normal and denormal numbers. This oddity is most easily explained by way of an example that involves counting down numbers, as on a number line, and examining what happens when the oddity is encountered. Within the encoding scheme for normal numbers, when one is counting down and the number goes from a whole number to a fraction (e.g., from 1.0 to 0.9, etc.) the significand is shifted up and the exponent is decremented by one (e.g., one goes from $1.0 \times 10^2$ to $9.0 \times 10^1$, etc.). But, when one is counting down and the numbers change from normal numbers to denormal numbers that pair of shift/decrement operations does not occur. For example, when one goes from $1.0 \times 2^{-126}$ to $0.1 \times 2^{-126}$, the significand of the denormal number does not shift up (i.e. it stays 0.1 instead of becoming 1.0), but the exponent portion still decrements (from 0x01 to 0x00, as denormal numbers are defined as having a 0 exponent portion). In the IEEE 754 standard, the exponent portion of 32-bit floating-point normal numbers is offset or biased by 127, such that $2^{-126}$ is encoded as 0x01. Unfortunately, the exponent portion of 32-bit floating-point denormal numbers is offset or biased by 126, such that $2^{-126}$ is encoded as 0x00. When adding a normal operand and denormal operand the difference in encoding schemes may be taken into consideration.

In the illustrated embodiment, the leading bit compensation circuit 250 is configured to shift the radix point of a denormal operand such that the significand has the same exponent portion encoding as it would if it was a normal number. In another embodiment, the radix alignment circuit 154 may be altered to perform this compensation itself. In yet another embodiment, the leading bit compensation circuit 250 may be configured to shift the radix point of the normal operand instead of the denormal operand, but this may result in a loss of precision.

In such an embodiment, if only one of the operands 202 and 204 are denormal (and the other normal), the leading bit compensation circuit 250 may be configured to compensate for a difference in the way denormal and normal numbers are encoded. The leading bit compensation circuit 250 is configured to shift the denormal pre-swapped signal 210. In various embodiments, the leading bit compensation circuit 250 may be controlled by a pair of signals 211 that determine which, if either, of the two pre-swapped signals 210 are to be shifted. In various embodiments, these control signals 211 may be derived from the output 213 of the denormal number detection circuit 252.

In various embodiments, the FPA 100 may include an exponent difference (ExpDiff) computation circuit 152 configured to determine which of the two operands 202 and 204 is the larger operand. This results in the size differentiation signal 111. In various embodiments, the ExpDiff computation circuit 152 may take more computing time than the denormal number detection circuit 252 and/or the leading bit compensation circuit 250. As such, in such an embodiment, no additional computation time may be incurred by the Far path 298 (compared to the traditional Far path) because of the inclusion of the denormal number detection circuit 252 and/or the leading bit compensation circuit 250.

As is traditionally done, the two operands (e.g., pre-swapped signals 210, etc.) are re-ordered or swapped, if needed, such that the larger or anchor operand 212 is placed on a desirable set of inputs for the adders 158 and 160, likewise with the smaller operand 214. This action is performed by a swap-multiplexer (MUX) 150. In the illustrated embodiment, the swap MUX 150 is controlled by the size differentiation signal 111.

As described above, addition is problematic if the fraction portions of the operands are not aligned. In some embodiments, the radix point of the smaller signal 214 may be shifted, in order that the radix points of the larger and smaller operands 212 and 214 are aligned. In the illustrated embodiment, this may be done by the alignment circuit 154. In such an embodiment, the alignment circuit 154 may be controlled by the output 112 of the ExpDiff computation circuit 152.

In the illustrated embodiment, the FPA 100 may be configured to detect if the operand 214 is significantly out of range of the larger operand 212. The circuit 156 (e.g., a series of OR gates, etc.) may in such a case produce at least one sticky bit 113 that indicates a non-zero smaller operand is out of range. In the illustrated embodiment, the sticky bit 113 and any additional control bits (e.g., a guard bit, a round bit, etc.) may be concatenated with the operands 212 and 214. It is understood that the above are merely a few illustrative examples to which the disclosed subject matter is not limited.

In various embodiments, the operands 212 and 214 may be input into an integer addition circuit 296. In the illustrated embodiment, the integer addition circuit 296 may include a pair of integer adders 158 and 160. In one embodiment, a first adder 158 may assume there is no overflow in the addition, and a second adder 160 may assume there will be an overflow in the addition, or in the case of subtraction, may assume there will be a 1-bit shift. In such an embodiment, the second adder 160 may make use of a carry-save arithmetic circuit 162 (e.g., a 3:2 compressor, etc.). In various embodiments, the adders 158 and 160 may also receive as input various rounding constants 116.

As described above, in various embodiments, these two integer adders 158 and 160 may be employed in parallel to increase the speed and ease of computation. In various embodiments, an integer addition selector 264 may be employed to select between the two outputs of the adders 158 and 160.

In a traditional system, the integer addition circuit 296 may include the integer addition selector. The integer addition selector may be controlled by an integer addition selection signal that is based upon an overflow indicator and a left shift indicator.

Conversely, in the illustrated embodiment, in the FPA 100 the integer addition selector 264 may be controlled by the integer addition selection signal 218. In such an embodiment, the value of the integer addition selection signal 218 may also be based, at least in part, upon an overflow indicator and a left shift indicator. However, the integer addition selection signal 218 may further be based upon an indication of whether the addition of two denormal operands (e.g., operand 202 and 204, etc.) resulted in a normal result (e.g. result 242, etc.). In such an embodiment, the integer addition selection signal 218 may be included by a far path denormal-to-normal correction circuit.

In the illustrated embodiment, in which not only normal numbers but also denormal operands 202 and 204 are processed, it is possible for the addition of two denormal numbers to create a normal number. In such an embodiment, the oddity with the exponent biasing of the denormal numbers must again be considered. In the illustrated embodiment, the selection logic 218 of the addition selector 264 has been altered to accommodate this occurrence. In such an embodiment, the integer addition selection signal 218 may further be based upon an indication of whether the addition of two denormal operands (e.g., operand 202 and 204, etc.) resulted in a normal result (e.g., result 242, etc.). In such an embodiment, a denormal-to-normal correction logic may be shared by the 1-bit left-shift correction mechanism in the add/round stage 296.

In the illustrated embodiment, the far path 298 may finally produce the far path result 242, as described above. In various embodiments, the portion of the far path 298 that includes the swap MUX 150 and the portion that includes the integer addition circuit 296 may be included in different pipeline stages (e.g., FX1, FX2, etc.). It is understood that the above is merely one illustrative example to which the disclosed subject matter is not limited.

The operation of the Close Path 299 is now examined. In various embodiments, the Close path 299 is configured to handle subtraction and only if the two operands 202 and 204 differ by an order of magnitude (or less). In some embodiments, the Close Path 299 is also configured to adjust for a phenomenon known as "massive cancellation" where the subtraction of two numbers results in a number small enough that either the radix point must be shifted to reach a properly formatted normal number or, in the illustrated embodiment, a denormal number is created.

In the illustrated embodiment, the operands 202 and 204 are input into the close path 299. The operands 202 and 204 are each subjected to a denormal number detection circuit 253. In one embodiment, the denormal number detection circuit 253 may include a series of OR gates (an OR tree), as described above. In one embodiment, denormal number detection circuit 253 may be configured to detect if the fraction portion of the respective operand 202 or 204 includes a leading 0. In various embodiments, the denormal number detection circuit 253 may generate a denormal indicator signal 213c. In various embodiments, the far denormal number detection circuit 252 and the close denormal number detection circuit 253 may be the same circuits. In another embodiment, two separate circuits and output signals may exist. It is understood that the above are merely a few illustrative examples to which the disclosed subject matter is not limited.

As described above, during the addition operation it is desirable that the operands 210 be aligned to a common radix point. In various embodiments, the close path 299 may include an alignment circuit 171 configured to shift the radix point of the smaller operand, if needed.

In various embodiments, the close path 299 of the FPA 100 may include an exponent difference (ExpDiff) computation circuit 172 configured to determine which of the two operands 202 and 204 is the larger operand. This results in the size differentiation signal 231. In various embodiments, the close path ExpDiff computation circuit 172 may be smaller (e.g., 2-bits, etc.) than the far path ExpDiff computation circuit 152 (e.g., 11-bits, etc.). This is because, being the close path 299, it may be assumed that the values of the operands 202 and 204 are not very far apart from each other.

Again, the two operands (e.g., pre-swapped signals 210, etc.) are re-ordered or swapped, if needed, such that the larger or anchor operand 232 is placed on a desirable set of inputs for the adders 174 and 176, likewise with the smaller operand 234. This action is performed by a swap-multiplexer (MUX) 170. In the traditional embodiment of an FPA, the swap MUX 170 may be controlled by a size differentiation signal that indicates which of the two operands 202 and 204 is larger. However, in one embodiment, the swap MUX 170 of FPA 100 may be controlled by the signal 231. In such an embodiment, the signal 231 may additionally be based upon whether the indicated smaller operand is denormal or not.

In various embodiments, the close path 299 may include two integer adders 174 and 176. In one embodiment, the first adder 174 may be configured to perform a subtraction of operand 234 from operand 232, whereas, the second adder 176 may be configured to perform a subtraction of operand 232 from operand 234. The selector or MUX 178 may be configured to select the result that is positive from the two adders 174 and 176 (based upon the control signal 135).

In various embodiments, when two floating-point numbers are subtracted, an effect known as "massive cancellation" may occur. In various embodiments, when the exponents of two operands are equal or differ by only one order of magnitude, it is possible for the numbers to be so close in value that the subtraction result includes one or more leading 0's in the significand or fraction portion. In such an embodiment, a shift of the radix point typically occurs to normalize the result, and return the leading 1 back to its expected place (if the number is a normal number).

In various embodiments, the close path 299 may be configured to normalize the result signal 236, as output by the MUX 178. In such an embodiment, this normalization may include shifting the radix point of the result signal 236 such that the number is in a proper floating-point format. In the case in which the result signal 236 is a normal number, this means shifting the radix point such that the fraction portion includes a leading one. In the case in which the result signal 236 is a denormal number, this means shifting the radix point but not so much that the exponent portion is no longer valid. In such an embodiment, the amount of radix shifting must be limited or clamped.

In the illustrated embodiment, the close path 299 may include a radix point shifting circuit 286. In such an embodiment, radix point shifting circuit 286 may be configured to estimate how much to shift the radix point of the close path result. In the illustrated embodiment, the radix point shifting circuit 286 may include the traditional elements of a leading zero estimator circuit and be configured to estimate how much to shift the radix point of the close path result 244 or the result signal 236. In such an embodiment, the leading zero estimator circuit may include a Lead Zero Anticipator (LZA) 180 and a Priority Encoder (PENC) 181.

In various embodiments, the LZA 180 may be configured to determine or estimate how many places the radix point needs to be shifted in order for the resulting number to have a non-zero leading digit. For example, in order for the number 0.0001 to be represented as $1.0 \times 2^{-4}$ the radix point will need to be shifted 4 times. In various embodiments, a Priority Encoder (PENC) 181 may be configured to convert the output 137 of the LZA 180 to an encoded value 138 that is easier to process by the bit-shifting hardware (e.g., components 175 and 273, etc.). In such an embodiment, the PENC 181 may be configured to detect the position of the first 1 in the LZA's output vector 137.

In the traditional FPA, the output 138 of the PENC 181 may be input to the radix shifter 175, as described below. However, in the illustrated embodiment of FIG. 1, because denormal numbers exist at the limit of the smallest possible exponent portions, it may not be possible to shift the significand up to a place where it includes a whole number (i.e., 1, etc.). This is because, each time one shifts the significand up a radix point, the exponent portion must be decremented. However, as the exponent portion of denormal numbers is so small, there comes a point where it cannot be further decremented and therefore, the significand must remain <1. This is why the leading bit for denormal numbers is 0 versus 1 for normal numbers. In the illustrated embodiment, logic and hardware components (e.g., components 281, 282, and 284, etc.) are employed to clamp or halt the radix shifting when one has reached the maximum amount of exponent decrementing that may occur (e.g., an exponent value of zero, etc.).

In the illustrated embodiment, the close path 299 may include a clamp circuit 287 configured to stop or halt the radix shifting of the close path result 244 or 236 when at least one of the two floating-point operands 202 and 204 includes a denormal number. In one embodiment, the clamp circuit 287 may be configured to determine if the close path result 244 or 236 is a denormal number, and if so, stop or halt the radix shifting of the close circuit path prior to exceeding a maximum amount of radix shift.

In the illustrated embodiment, the clamp circuit 287 may receive as input the exponent portion 237 of the larger operand 202 or 204. This exponent portion 237 may be evaluated by a maximum shift evaluator 281 to determine the maximum number of times the radix point may be shifted (or the number of times the exponent portion of the result 236 may be decremented) before the exponent portion of the result 236 is invalid. The exponent portion 237 may be compared against the output 138 of the PENC 181 to determine if the exponent portion 237 may be decremented as much as the PENC 181 suggests. In the illustrated embodiment, this may be done by the clamp detector 282. In the illustrated embodiment, a shift amount selector 284 may select between the output of the maximum shift evaluator 281 and the PENC 181 based upon the output of the clamp detector 282. In the illustrated embodiment, the clamp circuit 287 may include the maximum shift evaluator 281, the clamp detector 282, and the shift amount selector 284.

In the illustrated embodiment, the close path 299 may include a radix shifter 175, as described above. In such an embodiment, the radix shifter 175 may be configured to shift the radix point of the result 236 based upon the output 238 of the radix point shifting circuit 286.

In some embodiments, the LZA 180 may only produce an estimation and may not be as accurate as desired. Occasionally, the LZA 180 estimate may be off by one radix point. In such an embodiment, the close path 299 may include a compensating radix shifter 273. In the traditional FPA, the compensating radix shifter may be controlled by a signal that is based upon the correctness (or lack thereof) of the LZA 180.

However, in the illustrated embodiment of FIG. 1, the FPA 100 is configured to process both normal and denormal operands 202 and 204. As described above, in various embodiments, it is possible for the LZA to incorrectly predict a denormal number when the result is actually the minimum exponent, which, as described, may be off by one radix point. In such an embodiment, the oddity with the exponent biasing of the denormal numbers must again be considered. In the illustrated embodiment, the control logic and signal 239 of the compensating radix shifter 273 has been altered to accommodate this occurrence. In such an embodiment, a normal-to-denormal correction mechanism may be shared by the LZA correction logic 273, and the LZA correction logic 273 may be thought of as a close path denormal-to-normal correction circuit. In the illustrated embodiment, the output of the compensating radix shifter 273 is the close path result 244.

In various embodiments, the radix point shifting circuit 286 may include the LZA 180, the PENC 181, and the clamp circuit 287. In another embodiment, the radix point shifting circuit 286 may further include the radix shifter 175 and/or the compensating radix shifter 273. It is understood that the above are merely a few illustrative examples to which the disclosed subject matter is not limited.

In the illustrated embodiment, the close path 299 may finally produce the close path result 244, as described above. In various embodiments, the portion of the close path 299 that includes the swap MUX 170 and the portion that includes, at least some of the radix point shifting circuit 286 may be included in different pipeline stages (e.g., FX1, FX2, etc.). It is understood that the above is merely one illustrative example to which the disclosed subject matter is not limited.

In the illustrated embodiment, the FPA 100 may include a final result selector circuit 297 configured to select between the far path result 242 and the close path result 244. In some embodiments, this section may be based, at least in part, upon a difference in the exponent portions of the two floating-point operands 202 and 204 being less than a threshold amount (e.g., less than or equal an order of magnitude of difference in the exponents, etc.).

In a traditional FPA, the FPA may include a normal result selector or MUX that selects the close path result (as opposed to the far path result) when the difference in the exponent portions of the operands are sufficiently small (less than one order of magnitude).

Conversely, in the illustrated embodiment, the FPA 100 may include a result selector or MUX 290 that selects the close path result 244 (as opposed to the far path result 242) when a true subtract has occurred and where at least some massive cancellation has occurred or the exponent portions of the operands 202 and 204 are exactly equal. In this context, a "true subtraction" is when one (but not both) of the operands 202 and 204 are negative. Otherwise, in this context, a "true addition" occurs. This selection may be controlled by the signal 241. In the illustrated embodiment, the result selector or MUX 290 may output the floating-point result 248.

As described above, in various embodiments, the final result selector circuit 297 may also include an ultimate result selector 192 configured to select between the floating-point result 248 and a special result 246. In various embodiments, the special result 246 may be similar to the special or non-normal result of a traditional FPA, but as the case involving denormal numbers has been handled by the FPA 100, the special result 246 would not include the denormal number case. In the illustrated embodiment, the ultimate result selector 192 may output the ultimate result 149, as described above.

In various embodiments, the final result selector circuit 297 may be included in a different pipeline stage (e.g., FX3, etc.) than the far path circuit 298 and close path circuit 299 (e.g., FX1, FX2, etc.). It is understood that the above is merely one illustrative example to which the disclosed subject matter is not limited.

Figure 2A:
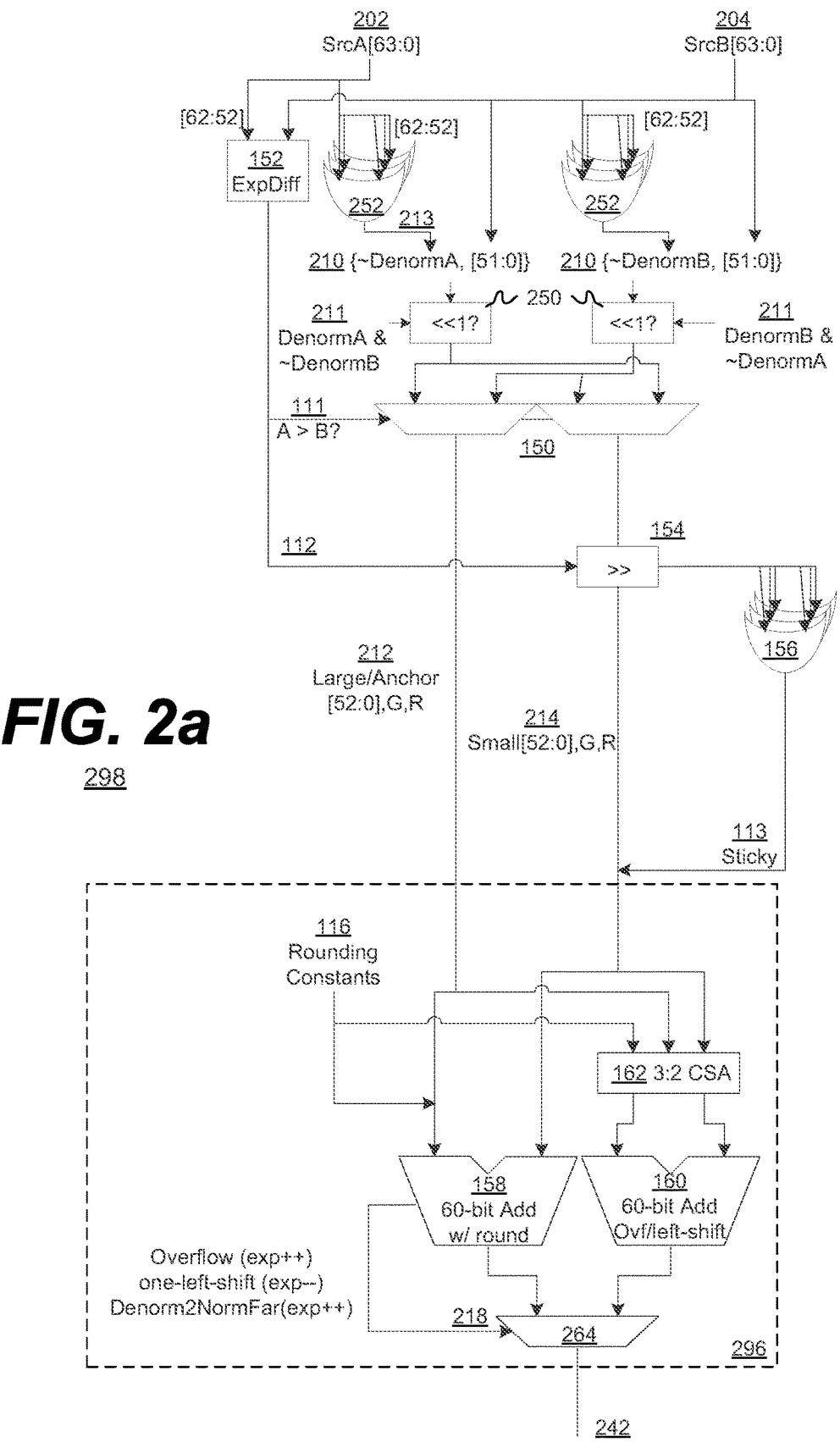
FIG. 2a is a block diagram of an example embodiment of a FAR path portion of a floating-point adder in accordance with the disclosed subject matter.

FIG. 2a is a block diagram of an example embodiment of a system in accordance with the disclosed subject matter. Specifically, FIG. 2a, illustrates an example embodiment of a Far path portion 298 of a FPA, such as that shown in FIG. 1. In the illustrated embodiment, the far path 298 receives two 64-bit operands, SrcA 202 and SrcB 204. It is understood that the above is merely one illustrative example to which the disclosed subject matter is not limited.

As described above, the operands 202 and 204 include a 64-bit double precision floating-point number. In such an embodiment, the 52 bits numbered 51-0 are the mantissa, fraction, or significand portion of the number. In the IEEE 754 the fraction portion includes a "hidden bit" that is not represented, as it can be derived from the exponent portion, giving the fraction portion 1 bit more precision than the number of bits assigned to store the fraction portion would generally allow (e.g., the 52-bit fraction portion has 53 bits of precision).

In such an embodiment, the 11 bits numbered 62-52 are the exponent portion of the number. As described above, the 11-bits of the exponent are biased such that both positive and negative exponents may be represented. In various embodiments, the exponent biasing of a normal number is such that a zero exponent has a value of 1023, allowing for exponents between $2^{1023}$ and $2^{-1022}$. Finally, the bit numbered 63 is a sign bit that indicates whether the fraction is positive or negative. As described above, in various embodiments, for a number to be considered a "normal" number, it must include a 1 in the hidden bit of the significand or fraction.

In the illustrated embodiment, the denormal number detection circuit 252 may receive the exponent portion (bits 52-62) of the operands 202 and 204. In such an embodiment, the denormal number detection circuit 252 may derive the hidden bit (which indicates whether the number is normal or denormal) from the exponent portion. As a denormal number includes a value of zero for the exponent portion, the hidden bit may be derived by ORing the bits of the exponent portion to determine if the exponent is non-zero. The inverse (logical NOT) of the respective result 213 of the denormal number detection circuit 252 is then concatenated with the fraction portion (bits 51-0) of the respective operands 202 and 204 to form the pre-swapped signals 210. In such an embodiment, the pre-swapped signals 210 may include the full (e.g., 53 bits, etc.) of precision of the significand.

As described above, in various embodiments, the respective signals 211 may be based upon the output 213 of the denormal number detection circuit 252 (DenormA and DenormB). In such an embodiment, the respective leading bit compensation circuit 250 may shift their respective pre-swap operands 210 if the receptive operand is denormal and the other normal.

As described above, the ExpDiff computation circuit 152 may receive the full exponent bits (bit #s 62-52) of the operands 202 and 204. From this it may produce the signal 111 that indicates if operand 202 is larger or smaller (in terms of orders of magnitude) than operand 204, and therefore indicates which operand 202 or 204 will become the larger operand 212 and the small operand 214. Further, the ExpDiff computation circuit 152 may produce the signal 112 that indicates how many places the radix point of the small operand 214 needs to be shifted to align it with the large or anchor operand 212. In the illustrated embodiment, this signal 212 may be employed by the alignment circuit 154.

As described above, after passing through the swap MUX 150 the operands 210 may be designated the large operand 212 and the small operand 214. In the illustrated embodiment, the operands 212 and 214 may include the 52-bits of the respective operands 210. In the illustrated embodiment, the operands 212 and 214 may also include their respective Guard (G) bit and Round (R) bits. In various embodiments, the guard bit may be configured to "guard" against rounding errors. Likewise, the Round bit may be configured to affect a rounding decision. In various embodiments, these two G and R bits may effectively add two more bits of precision to the computation. Further the sticky bit, generated by circuit 156, may bring the width of the operands 212 and 214 to 56-bits each.

As described above, in the illustrated embodiment, the adder 158 may include a 60-bit integer adder configured to perform rounding operations. In such an embodiment, the adder 158 may be configured to assume that no exponent shift occurs during the addition. Conversely, in the illustrated embodiment, the adder 160 may include a 60-bit integer adder configured to taking to account overflow or 1-bit left shift and perform the standard normalization operations.

In the illustrated embodiment, the selection logic 218 considers three possible events. If an overflow occurred the exponent portion may be incremented. If a subtraction caused the result to not include a whole number (e.g., 1.0+(−0.75)=0.25, etc.) the significand may be shifted and the exponent adjusted to form a proper normal number (e.g., 0.25 becomes $2.5 \times 10^{-1}$, etc.). In the illustrated embodiment, if the addition two denormal numbers resulted in a normal number, the exponent portion of the result must be incremented as the exponent biasing between normal numbers and denormal numbers is not the same, as described above. It is understood that the above is merely one illustrative example to which the disclosed subject matter is not limited.

Figure 2B:
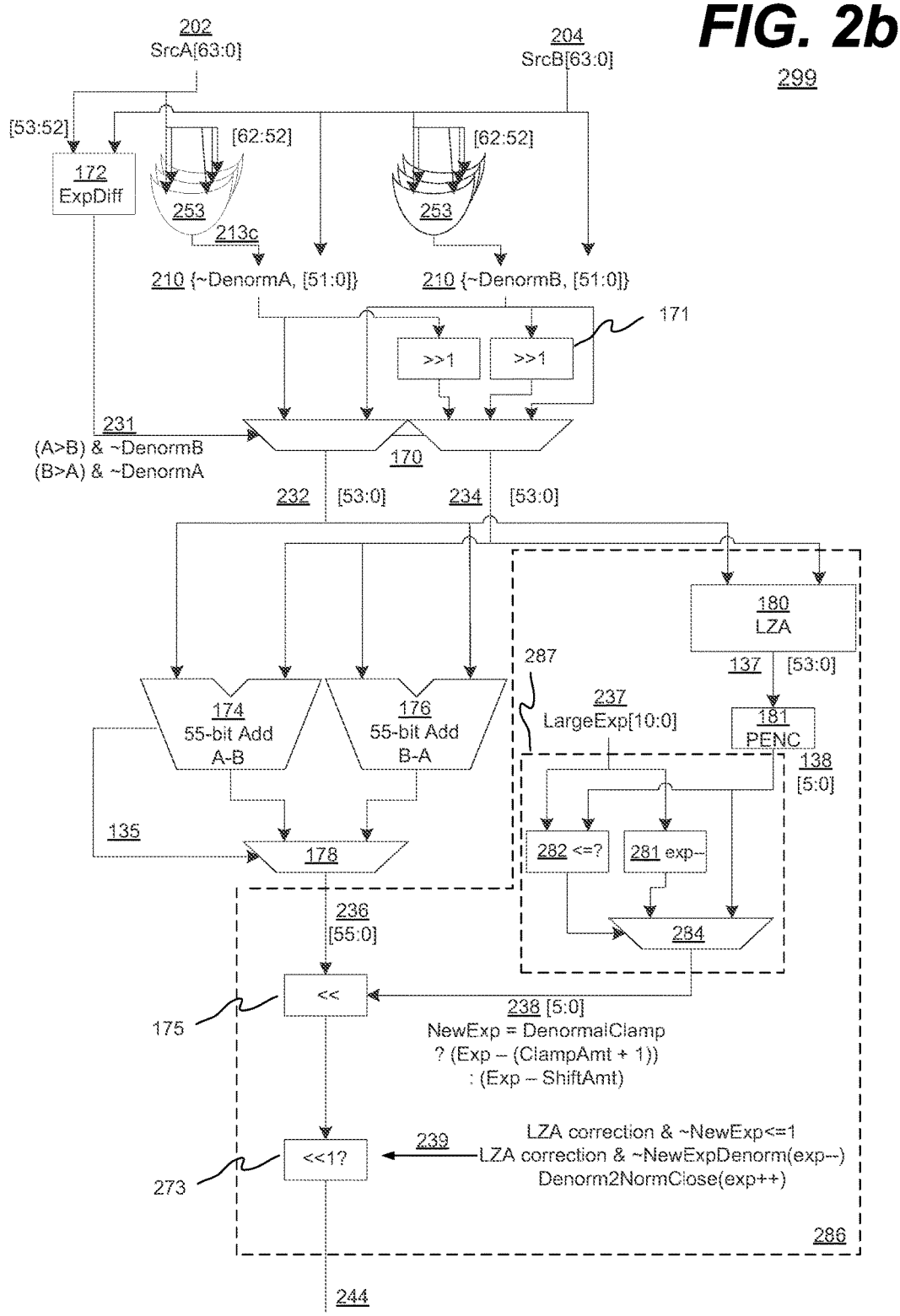
FIG. 2b is a block diagram of an example embodiment of a CLOSE path portion of a floating-point adder in accordance with the disclosed subject matter.

FIG. 2b is a block diagram of an example embodiment of a system in accordance with the disclosed subject matter. Specifically, FIG. 2b, illustrates an example embodiment of a Close path portion 299 of a FPA, such as that shown in FIG. 1. In the illustrated embodiment, the close path 299 receives two 64-bit operands, SrcA 202 and SrcB 204. It is understood that the above is merely one illustrative example to which the disclosed subject matter is not limited.

Again, in the illustrated embodiment, the denormal number detection circuit 253 receives the exponent portion of the operands 202 and 204. From this, it may be determined if the operand is normal or denormal. Likewise, the inverse (logical NOT) of the respective result 213 of the denormal number detection circuit 252 may then concatenated with the fraction portion (bits 51-0) of the respective operands 202 and 204 to form the pre-swapped signals 210. In such an embodiment, the pre-swapped signals 210 may include the full (e.g., 53 bits, etc.) of precision of the significand.

As described above, in the illustrated embodiment, the exponent difference (ExpDiff) computation circuit 172 may receive the two least significant bits (bits # 53 and 52) of the exponents of the operands 202 and 204. In such an embodiment, the ExpDiff computation circuit 172 may include 2-bits as it is assumed in the Close path 299 that the operands 202 and 204 are within one order of magnitude of each other.

In the illustrated embodiment, the timing requirements of the 2-bit ExpDiff computation circuit 172 may be less than that of the denormal number detection circuit 253. In such an embodiment, the denormal number detection circuit 253 may increase the timing requirements of the close path 299, compared to the traditional FPA circuit. However, as the overall critical timing path of the FPA 100 is included in the Far path 298, the overall timing of the FPA 100 is not increased due to the addition of the denormal number detection circuit 253 in the Close path 299. It is understood that the above is merely one illustrative example to which the disclosed subject matter is not limited.

In the illustrated embodiment, the signal 231 has been modified to not only consider whether the operand 202 is larger than the operand 204, but also whether the operand is denormal and the other operand is normal. In such an embodiment, the correction or compensation for the difference in exponent biasing between normal and denormal numbers may occur (via the alignment circuit 171).

In the illustrated embodiment, the adder 174 may include a 55-bit adder configured to subtract operand B 234 from operand A 232. In addition, the adder 176 may include a 55-bit adder configured to subtract operand A 232 from operand B 234.

In the illustrated embodiment, the LZA 180 may output a 54-bit vector 137. In such an embodiment, the PENC 181 may convert this 54-bit vector 137 to a 6-bit encoded output value 138. In various embodiments, the maximum shift evaluator 281 and the clamp detector 282 may receive as inputs the exponent portion of the largest operand 237.

In the illustrated embodiment, the output 238 of the MUX 284 may be configured to produce a new exponent value for the result signal 236 based upon whether the clamp detector 282 invoked the denormal clamp function or not. If the clamp detector 282 determined that the amount of radix point shifting is to be limited or clamped, the exponent value is to be decremented by the amount 138 suggested by the PENC 181. In various embodiments, this may include setting the exponent value to zero. Otherwise, the exponent value is to be decremented by the amount suggested by the maximum shift evaluator 281. Further, in various embodiments, an additional decrement of the exponent may occur to adjust for the difference in exponent biasing between normal and denormal numbers.

In the illustrated embodiment, the control logic and signal 239 of the compensating radix shifter 273 may be configured to adjust the radix point if the LZA estimation 137 was incorrect and the result signal 236 is a normal number. If the LZA estimation 137 was incorrect and the result signal 236 is not a denormal number but should be, the exponent may be decremented. If the LZA estimation 137 was incorrect and the result signal 236 is denormal number but should not be, the exponent may be incremented to adjust for the difference in normal versus denormal exponent biasing. Again, in the illustrated embodiment, the close path result 244 may be produced.

FIG. 2c is a block diagram of an example embodiment of a system in accordance with the disclosed subject matter. Specifically, FIG. 2c, illustrates an example embodiment of a selection circuit 297 of a FPA, such as that shown in FIG. 1. In the illustrated embodiment, the selection circuit 297 receives three results, far path result 242, close path result 244, and special result 246. In various embodiments, the special result 296 may include a plurality of special results (e.g., one for each arithmetic exception not including the denormal number exception, etc.). It is understood that the above is merely one illustrative example to which the disclosed subject matter is not limited.

As described above, in the illustrated embodiment, the result selector 290 may be configured to select between the far path result 242 or the close path result 244 based upon the signal 241. In the illustrated embodiment, the signal 241 may cause the close path result 244 to be selected if, both a true subtraction occurred, and either a massive cancellation occurred or the difference in the exponents of the operands 202 and 204 was zero. It is understood that the above are merely a few illustrative examples to which the disclosed subject matter is not limited.

In the illustrated embodiment, the system may include one or more special computation paths 296. Each path may be configured to compute or process one or more arithmetic exceptions, as described above. In various embodiments, the special computation paths 296 may generate one or more special results 246. As described above, the ultimate result selector 192 configured to select between the floating-point result 248 and a special result 246. In various embodiments, the FPA may not include the special computation path(s) 296 or the ultimate result selector 192. It is understood that the above is merely one illustrative example to which the disclosed subject matter is not limited.

Figure 3:
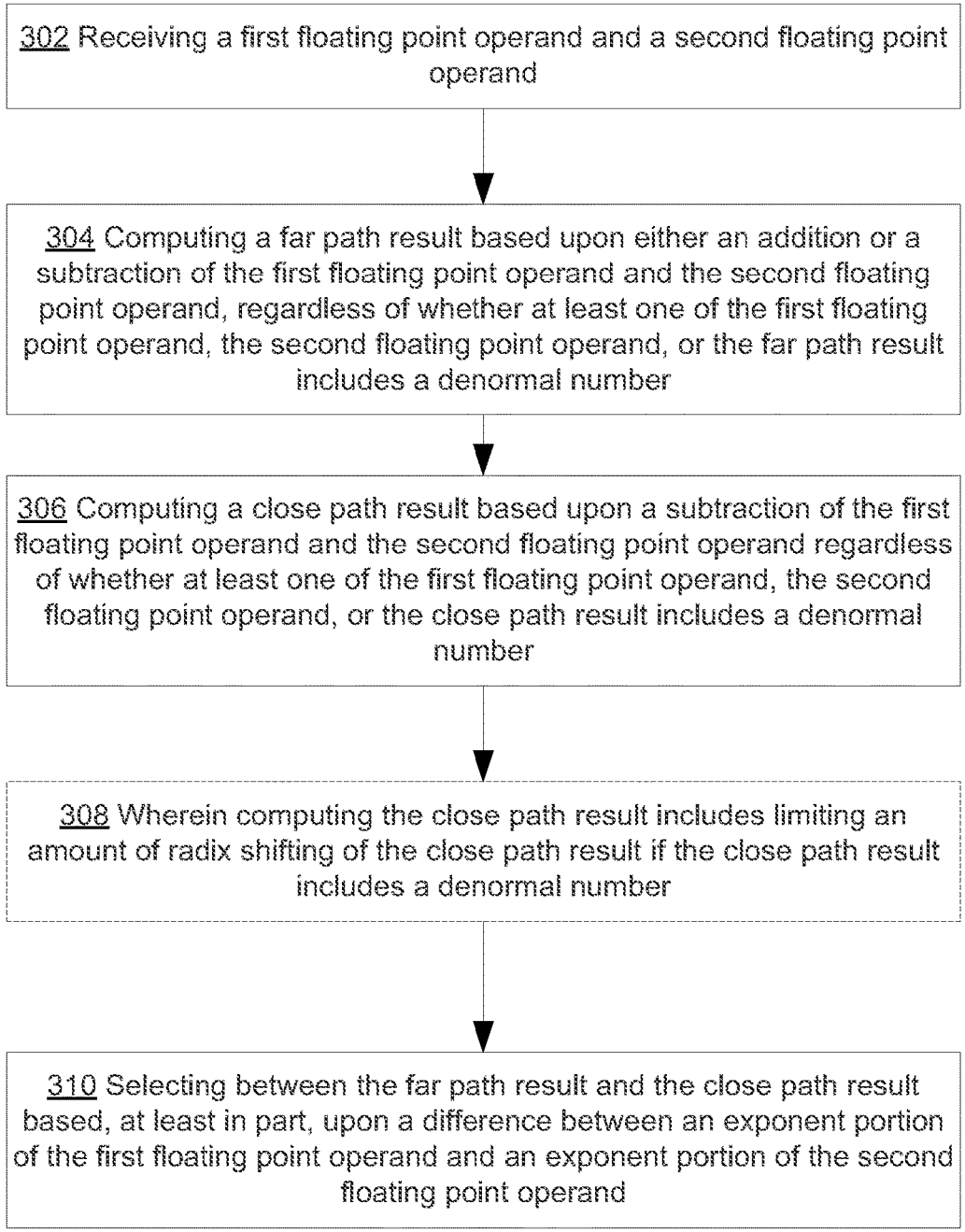
FIG. 3 is a flowchart of an example embodiment of a technique in accordance with the disclosed subject matter.

FIG. 3 is a flowchart of an example embodiment of a technique 300 in accordance with the disclosed subject matter. In various embodiments, the technique 300 may be used or produced by the systems such as those of FIGS. 1, 2a, 2b, and/or 2c. Although, it is understood that the above are merely a few illustrative examples to which the disclosed subject matter is not limited. It is understood that the disclosed subject matter is not limited to the ordering of or number of actions illustrated by technique 300.

Block 302 illustrates that, in one embodiment, a first floating-point operand and a second floating-point operand may be received, as described above. In some embodiments, the first and second floating-point operands may include normal numbers, denormal numbers, or a combination thereof, as described above. In various embodiments, one or more of the action(s) illustrated by this Block may be performed by the apparatuses or systems of FIG. 1, 2a, 2b, or 2c, the operands 202 and 204 of FIG. 1, 2a, 2b, or 2c, as described above.

Block 304 illustrates that, in one embodiment, a far path result may be computed based upon either an addition or a subtraction of the first floating-point operand and the second floating-point operand, as described above. In various embodiments, this far path computation may occur regardless of whether at least one of the first floating-point operand, the second floating-point operand, or the far path result includes a denormal number, as described above. In various embodiments, computing a far path result may include adjusting an exponent portion of the far path result if the first floating-point operand and the second floating-point operand both include a denormal number and the far path result includes a normal number, as described above. In some embodiments, computing a far path result may include adjusting an exponent portion of the far path result if the first floating-point operand and the second floating-point operand both include a denormal number and the far path result includes a normal number, as described above. In various embodiments, one or more of the action(s) illustrated by this Block may be performed by the apparatuses or systems of FIG. 1, 2a, 2b, or 2c, the far path circuit 298 of FIG. 1, 2a, or 2c, the leading bit compensation circuit 250 of FIG. 1, or 2a, or the integer addition circuit 296 of FIG. 1, or 2a as described above.

Block 306 illustrates that, in one embodiment, a close path result may be computed based upon a subtraction of the first floating-point operand and the second floating-point operand, as described above. In one embodiment, the computing may occur regardless of whether at least one of the first floating-point operand, the second floating-point operand, or the close path result includes a denormal number, as described above. In various embodiments, computing the close path result may include adjusting a radix shifting of the close path result if the close path result includes a denormal number, as described above. In some embodiments, computing the close path result may include shifting a radix point of a floating-point operand if the floating-point operand includes a denormal number, as described above. In various embodiments, one or more of the action(s) illustrated by this Block may be performed by the apparatuses or systems of FIG. 1, 2a, 2b, or 2c, the close path circuit 299 of FIG. 1, 2b, or 2c, the alignment circuit 171 of FIG. 1, or 2b, the radix point shifting circuit 286 of FIG. 1, or 2b, or the compensating radix shifter 273 of FIG. 1, or 2b as described above.

Block 308 illustrates that, in one embodiment, computing the close path result may include limiting an amount of radix shifting of the close path result if the close path result includes a denormal number, as described above. In various embodiments, computing the close path result may include estimating an estimated amount to shift a radix point of the close path result, as described above. In such an embodiment, computing the close path result may include determining if the close path result is a denormal number, as described above. In one such embodiment, computing the close path result may include limiting the amount of radix shifting of the close path result, so as to not exceed a maximum amount of radix shifting, as described above. In various embodiments, one or more of the action(s) illustrated by this Block may be performed by the apparatuses or systems of FIG. 1, 2a, 2b, or 2c, the close path circuit 299 of FIG. 1, 2b, or 2c, the clamp circuit 287 of FIG. 1, or 2b, the radix point shifting circuit 286 of FIG. 1, or 2b, the compensating radix shifter 273 or the radix shifter 175 of FIG. 1, or 2b as described above.

Figure 4:
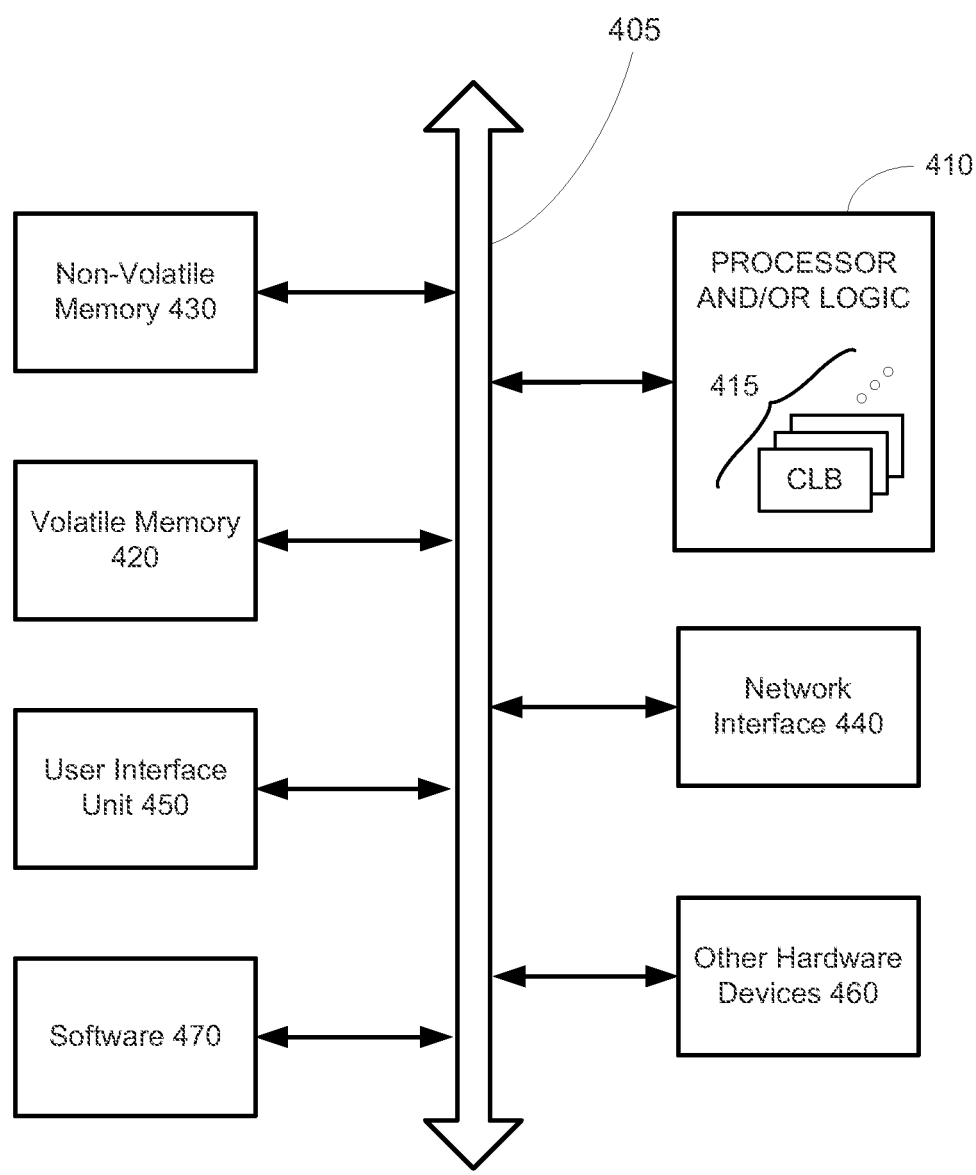
FIG. 4 is a schematic block diagram of an information processing system, which may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM), etc.). The information processing system 400 according to the disclosed subject matter may further include a non-volatile memory 430 (e.g., a hard drive, an optical memory, a NAND or Flash memory, etc.). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 400 according to the disclosed subject matter may further include a user interface unit 450 (e.g., a display adapter, a haptic interface, a human interface device, etc.). In various embodiments, this user interface unit 450 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor, etc.). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440, etc.) of the information processing system 400. In such an embodiment, the information processing system 400 may include one or more native applications, which may be installed locally (e.g., within the non-volatile memory 430, etc.) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 410.

The semiconductor devices described above may be encapsulated using various packaging techniques. For example, semiconductor devices constructed according to principles of the present inventive concepts may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:
1. An apparatus comprising:
a floating-point addition unit comprising:
a far path circuit configured to compute a far path result based upon two floating-point operands, a close path circuit configured to compute a close path result based upon the two floating-point operands regardless of whether or not one or more of the two floating-point operands and the close path result includes a denormal number, wherein the close path circuit comprises:
    a radix shifter circuit configured to perform radix shifting of the close path result,
    a clamp circuit configured to detect, based upon a leading zero anticipator, if the close path result includes a denormal number and, if so, limit a radix shifting of the close path result, and
    a normal-to-denormal correction circuit configured to provide an additional radix shift to convert a normal number to a denormal number, if the leading zero anticipator incorrectly predicted a denormal number; and a final result selector circuit configured to select between the far path result and the close path result.

2. The apparatus of claim 1, wherein the final result selector is configured to select between the far path result and the close path result, such that the close path result is selected only if the floating-point addition unit generated a floating-point result via a true subtraction, and either a respective exponent portion of each of the floating-point operands are equal to each other or a massive cancellation occurred during the generation of the floating-point result.

3. The apparatus of claim 1, wherein the far path circuit comprises:
    a denormal-to-normal correction circuit configured to adjust an exponent portion of the far path result if the two floating-point operands both include a denormal number and the far path result includes a normal number.

4. The apparatus of claim 1, wherein the far path circuit includes a denormal number detection circuit configured to determine if either of the two floating-point operands includes a denormal number.

5. The apparatus of claim 1, wherein the far path circuit includes a leading bit compensation circuit configured to shift a radix point of a floating-point operand if the floating-point operand includes a denormal number.

6. The apparatus of claim 1, wherein the close path circuit includes a denormal number detection circuit configured to determine if either of the two floating-point operands includes a denormal number.

7. The apparatus of claim 1, wherein the close path circuit includes a radix point shifting circuit configured to estimate an amount to shift the radix point of the close path result; and
wherein the radix point shifting circuit comprises:
    a leading zero anticipator circuit configured to estimate an estimated amount to shift the radix point of the close path result, and
    the clamp circuit.

8. The apparatus of claim 7, wherein the clamp circuit comprises:
    a maximum shift evaluator circuit configured to determine the maximum number of times the radix point may be shifted before the exponent portion of the close path result is invalid, and
    a clamp limiting circuit configured to determine, based at least in part upon an exponent portion of one of the floating-point operands, if the radix point of the close path result if to be shifted the estimated amount.

9. The apparatus of claim 7, wherein the clam circuit comprises:

a radix shifter coupled between the clamp circuit and the normal-to-denormal correction circuit, and configured to shift the radix point of the close path result by an amount indicated by the clamp circuit.

10. An apparatus comprising:
a floating-point addition unit configured to generate a floating-point result by mathematically combining two floating-point operands together; and the floating-point addition unit comprising:
    a radix shifter circuit configured to shift a radix point of a partial result,
    a clamp circuit configured to detect, based upon a leading zero anticipator, if the partial result includes a denormal number and, if so, limit the radix shifting of the partial result, and
    a normal-to-denormal correction circuit configured to provide an additional radix shift to convert a normal number to a denormal number in response to the leading zero anticipator incorrectly predicting a denormal number.

11. The apparatus of claim 10, wherein the floating-point addition unit comprises a close path circuit configured to compute the partial result based upon the two floating-point operands regardless of whether or not one or more of the two floating-point operands and the close path result includes a denormal number.

12. The apparatus of claim 10, wherein the clamp circuit comprises:
    a maximum shift evaluator circuit configured to determine the maximum number of times the radix point may be shifted before the exponent portion of the close path result is invalid, and
    a clamp limiting circuit configured to determine, based at least in part upon an exponent portion of one of the floating-point operands, if the radix point of the close path result if to be shifted the estimated amount.

13. The apparatus of claim 10, wherein the radix shifter circuit is coupled between the clamp circuit and the normal-to-denormal correction circuit.

14. The apparatus of claim 10, wherein the floating-point addition unit comprises a radix point shifting circuit, the radix point shifting comprising:
    the leading zero anticipator,
    a priority encoder circuit,
    the clamp limiting circuit,
    the radix shifter circuit, and
    the normal-to-denormal correction circuit.

15. The apparatus of claim 10, wherein the floating-point addition unit comprises a far path circuit configured to compute a far path result based upon a mathematical combination of the two floating-point numbers regardless of whether any of the two floating-point operands or the floating-point result respectively include a normal number or a denormal number.

16. A system comprising:
a memory configured to store two floating-point operands; and
a processor comprising
a floating-point addition unit comprising:
    a close path circuit configured to compute a close path result based upon the two floating-point operands regardless of whether or not one or more of the two floating-point operands and the close path result includes a denormal number,
    wherein the close path circuit comprises:
        a radix shifter circuit configured to perform radix shifting of the close path result, a clamp circuit configured to detect if the close path result includes a denormal number and, if so, limit a radix shifting of the close path result, and a normal-to-denormal correction circuit configured to provide an additional radix shift to convert a normal number to a denormal number, if the clamp circuit incorrectly predicted a denormal number; and a final result selector circuit configured to select between a far path result and the close path result.

17. The system of claim 16, wherein the final result selector is configured to select between the far path result and the close path result based, at least in part, upon whether the respective exponent portions of each of the floating-point operands are equal to each other and if the floating-point addition unit generated the floating-point result via a true subtraction.

18. The system of claim 16, wherein the far path circuit comprises a denormal-to-normal correction circuit configured to adjust an exponent portion of the far path result if the two floating-point operands both include a denormal number and the far path result includes a normal number; and wherein the close path circuit comprises a normal-to-denormal correction circuit configured to adjust a radix shifting of the close path result by:

decrementing an exponent portion of the close path result, if the leading zero anticipator incorrectly predicted the close path result as a denormal number, and incrementing the exponent portion of the close path result, if the leading zero anticipator incorrectly predicted the close path result as a normal number.

19. The system of claim 16, wherein the far path circuit includes a leading bit compensation circuit configured to shift a radix point of a floating-point operand if the floating-point operand includes a denormal number.

20. The system of claim 16, wherein the close path circuit includes:

a leading zero estimator circuit configured to estimate an estimated amount to shift a radix point of the close path result, the clamp circuit configured to determine if the close path result is a denormal number, and if so, generate a denormal clamped amount to shift the radix point of the close path result, wherein the denormal clamped amount includes a value small enough to prevent massive cancellation of a denormal number, and a radix shifter circuit configured to shift a radix point of the close path result based upon either the estimated amount or the denormal clamped amount, depending upon whether the close path result includes a denormal number.

* * * * *